United States Patent [19]
Gaier

[11] Patent Number: 5,260,124
[45] Date of Patent: Nov. 9, 1993

[54] INTERCALATED HYBRID GRAPHITE FIBER COMPOSITE

[75] Inventor: James R. Gaier, Strongsville, Ohio

[73] Assignee: The United States of America as represented by the Administrator of the National Aeronautics and Space Administration, Washington, D.C.

[21] Appl. No.: 798,464

[22] Filed: Nov. 25, 1991

[51] Int. Cl.$^5$ .................. B32B 9/00; B64C 1/00; H05F 3/00

[52] U.S. Cl. .................. 428/257; 244/1 A; 361/218; 428/260; 428/288; 428/289; 428/334; 428/367; 428/368; 428/408; 428/902

[58] Field of Search .............. 428/257, 260, 288, 289, 428/334, 368, 367, 378, 389, 408, 922; 244/1 A; 361/218; 252/500, 506, 518

[56] References Cited

U.S. PATENT DOCUMENTS

| | | | |
|---|---|---|---|
| 3,629,049 | 12/1971 | Olcott | 428/368 |
| 4,388,227 | 6/1983 | Kalnin | 252/510 |
| 4,414,142 | 11/1983 | Vogel et al. | 252/506 |
| 4,448,838 | 5/1984 | McClenahan et al. | 428/251 |
| 4,481,249 | 11/1984 | Ebneth et al. | 428/288 |
| 4,494,165 | 1/1985 | Maheshwari | 361/117 |
| 4,522,889 | 6/1985 | Ebneth et al. | 428/614 |
| 4,642,201 | 2/1987 | Vogel | 252/503 |
| 4,749,514 | 6/1988 | Murakami et al. | 252/500 |
| 4,816,289 | 3/1989 | Komatsu et al. | 423/447.3 |
| 4,863,773 | 9/1989 | Rousseau et al. | 428/68 |
| 4,915,925 | 4/1990 | Chung | 423/447.1 |
| 5,089,325 | 2/1992 | Covey | 428/246 |

*Primary Examiner*—George F. Lesmes
*Assistant Examiner*—Christopher Brown
*Attorney, Agent, or Firm*—Gene E. Shook; Guy M. Miller; James A. Mackin

[57] ABSTRACT

Highly conducting lightweight hybrid materials are obtained by weaving strands of carbon or graphite fibers into a 2-dimensional fabric-like structure, depositing a layer of carbon onto the fibers of the fabric-like structure, heating the fabric-like structure to graphitize the carbon layer and intercalating the graphitized carbon layer. Composite materials for use in lightning strike protection are composed of at least one layer of the highly conducting lightweight hybrid material and at least one layer of traditional composite materials.

16 Claims, 1 Drawing Sheet

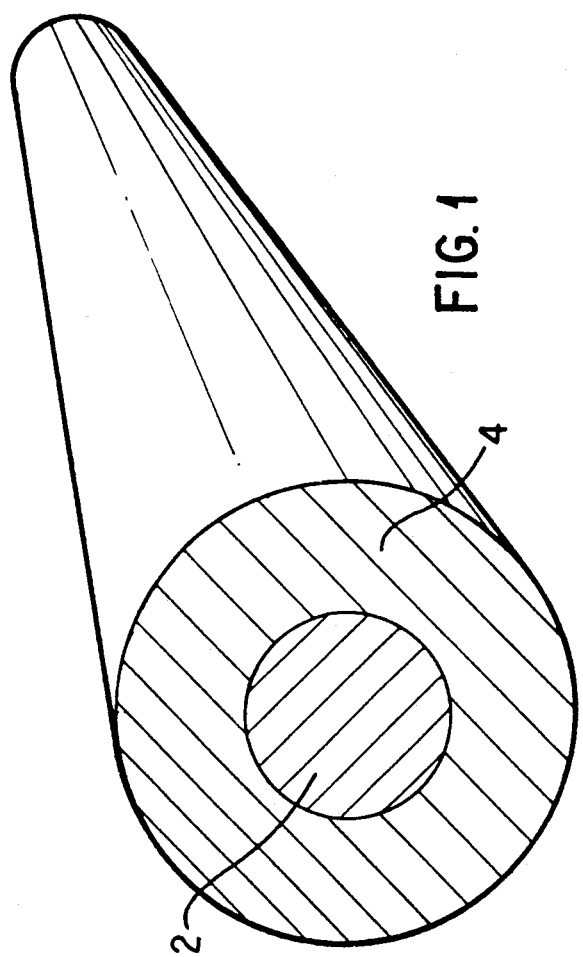
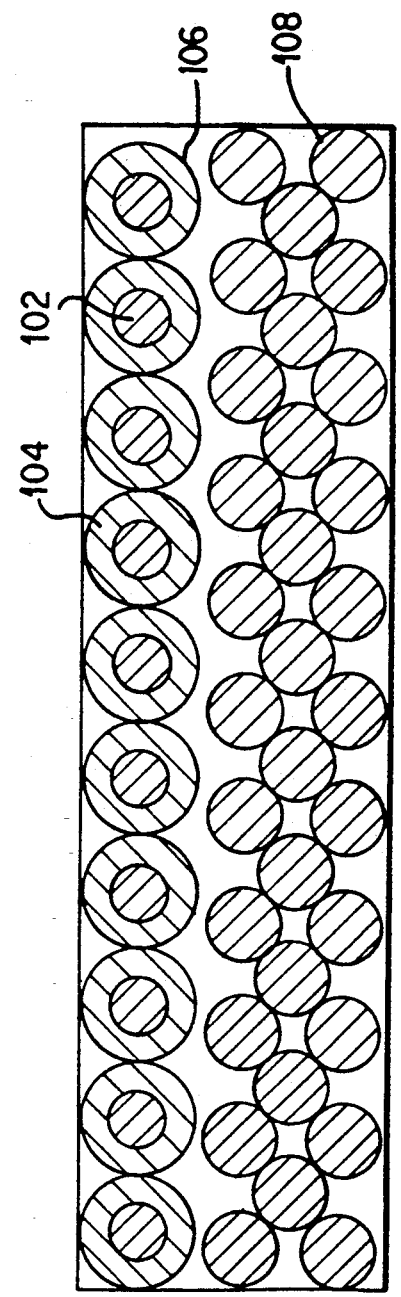

INTERCALATED HYBRID GRAPHITE FIBER COMPOSITE

ORIGIN OF THE INVENTION

The invention described herein was made by an employee of the United States government and may be manufactured or used by or for the United States government without the payment of any royalties thereon or therefor.

FIELD OF THE INVENTION

The present invention is directed to electrically conductive composite materials. More particularly, the invention is directed to graphite fiber composite materials and methods of producing the same.

BACKGROUND

Ever since the mechanical properties of composite materials, as for example, glass, polymers, or graphite fibers in a polymer matrix have surpassed those of aluminum, the trend has been for the increased use of these materials in the aerospace industry. Their light weight combined with high strength naturally lends itself to use in aircraft and spacecraft. There has not been, however, widespread development of all composite airplanes because the electrical conductivity of these composite materials is too low to withstand the effects of lightning strike.

As a solution to this problem, metal has been added to the composites. This can take the form of metal surfaces such as metal foils or expanded metal foils, embedded metal wires, and metal filaments, either on the individual composite fibers or on the complete structure.

For example, U.S. Pat. No. 4,448,838 to McClenahan et al. teaches a graphite fiber reinforced laminate structure which contains a metal wire or a metal coated filament which is woven in at least the outer ply of the graphite reinforced laminate structure. The metal provides the graphite reinforced polymer with lightning protection. U.S. Pat. No. 4,481,249 to Ebneth et al. discloses carbon filaments, fibers and sheets manufactured from them which are obtained when the carbon filaments and fibers are provided with a metal coating.

The inclusion of metal in composite structures, however, is not without problems. In instances where metal coatings are used, there is a particular problem with the coatings adhering to the surfaces. As temperatures change, metal layers expand much more rapidly than the glass or carbon fiber layers below. This causes internal stress which is relieved by the separation of the metal layer from the adjacent fiber layer. Additionally, since metals are more dense than the fibers, as more protection is required, more weight is added to the structure. Thus, at some point the advantages of using composite structures are lost because of the added weight. Moreover, the processes by which the metals are included in or on the composite structures are often expensive and labor intensive because adding the metal introduces manufacturing complexities. There also may be complex electrical and chemical interactions between the metal and the organic composite. Often this requires the rigorous exclusion of water from the manufacturing system.

In order to eliminate disadvantages of using metals in composites, the use of metals should be avoided. Therefore, materials other than metals which are good conductors of electricity are needed.

Carbon fibers currently used in the aerospace industry are reasonably good conductors (resistance of 2000 $\mu\Omega$-cm) but have a resistance which is still nearly three orders of magnitude greater than aluminum (2.7 $\mu\Omega$-cm). Graphitic carbon is substantially more conductive than the carbon fibers, and graphitic fibers have been made which have resistances as low as 70 $\mu\Omega$-cm.

The resistance of graphitic carbon fibers has been lowered to values less than that of silver through the process of intercalation, the addition of guest atoms or molecules into the graphite lattice, forming a compound which consists of carbon layers and intercalate layers stacked on top of each other. U.S. Pat. No. 4,414,142 to Vogel et al. teaches the incorporation of intercalated carbon or graphite into an organic composite matrix, resulting in composites with electrical conductivity higher than similar products made with non-intercalated graphite. U.S. Pat. No. 4,749,514 to Murakami et al. discloses a high grade graphite fiber obtained by heat treating specific polymer films and intercalating them in a vacuum or in an inert gas atmosphere. This intercalated graphite has improved stability over prior graphite intercalates. U.S. Pat. No. 4,915,925 to Chung discloses a method for producing exfoliated graphite fibers, by intercalating fibers and then exfoliating the intercalated fibers by heating. These fibers have a high degree of electrical conductivity.

Intercalated pitch based carbon fibers, although having an overall decreased electrical resistance, fail to stand up to lightning strikes. This is apparently caused by the inability of the pitch based fibers to withstand the thermal shock accompanying a lightning strike. U.S. Pat. No. 4,863,773 to Rousseau et al. discloses a composite material of a substrate carbon fiber covered with a fine silicon carbide coating and embedded in a carbon matrix. This material is useful to withstand high heat and is used in spacecraft but does not appear to have improved electrical conductivity.

SUMMARY OF THE INVENTION

The present invention is directed to a highly conductive lightweight hybrid material, a composite laminate and methods of producing the same. The hybrid material may be obtained by weaving strands of high strength carbon or graphite fibers into a two-dimensional fabric-like structure, depositing a layer of carbon onto the fibers of the fabric-like structure, heat treating the fabric-like structure to a temperature sufficient to graphitize the layer of carbon, and intercalating the graphitic carbon layer. A highly conductive laminate composite comprises at least one layer of the hybrid material and at least one layer of strands of high strength carbon or graphite fibers in a polymer matrix. The hybrid materials according to the present invention are compatible with matrix compounds, have a coefficient of thermal expansion which is the same as underlying carbon or graphite fiber layers, and are resistant to galvanic corrosion. Materials according to the present invention have an electrical conductance which is preferably less than about 70 $\mu\Omega$-cm, more preferably less than about 25 $\mu\Omega$-cm, and most preferably less than about 15 $\mu\Omega$-cm.

Materials according to the present invention are especially useful for aircraft and spacecraft components which must withstand lightning strike. They are also useful in EMI-EMP shielding, electrostatic protection, grounding planes, fault current paths, power buses and other applications where high strength, light weight and good conductivity are desired.

BRIEF DESCRIPTION OF THE DRAWINGS

A more complete understanding of the present invention can be obtained by reference to the accompanying drawings, wherein:

FIG. 1 is a sectional view of an individual hybrid graphite-polyacrylonitrile fiber.

FIG. 2 shows a hybrid laminate composite comprised of a layer of hybrid material according to the present invention over conventional polyacrylonitrile (PAN) based carbon fibers.

DETAILED DESCRIPTION OF PREFERRED EMBODIMENTS

The present invention pertains to a highly conductive lightweight hybrid material. The material comprises a woven fabric-like base of intersecting warp and weft strands of high strength carbon or graphite fiber and a layer of graphitized intercalated carbon uniformly disposed on the fiber. The warp and weft strands of fibers are fused at their intersections by the presence of the overlying graphitic carbon layer. Material according to the present invention is obtained by weaving strands of high strength carbon or graphite fibers into a two-dimensional fabric-like structure, depositing a layer of carbon onto the fibers of the fabric-like structure, heat-treating the structure at a temperature sufficient to graphitize the carbon layer, and intercalating the graphitic carbon layer.

Suitable carbon fibers for use in the present invention include, but are not limited to, polyacrylonitrile (PAN) based carbon fibers and pitch-based carbon fibers. Typical PAN fibers have a diameter of about 5 to about 8 microns and are generally available in strands of from about 1000 to about 8000 fibers. Polyacrylonitrile based carbon fibers can be obtained from numerous sources including Amoco. Amoco PAN fibers are designated by their tensile strength (T-300, T-400, or T-40). Pitch-based carbon fibers are typically about 10 microns in diameter and are generally available in strands of from about 1000 to about 2000 fibers. Pitch-based carbon fibers can also be obtained from Amoco and are designated by their modulus (P-25, P-35, P-75 or P-100).

Any number of weave types are suitable for use in the present invention. Weave types useful in the present invention include but are not limited to plain weaves and satin weaves, with satin weaves being preferred. Plain weaves are weaves wherein a single weft fiber goes across a single warp fiber, before going under the next warp fiber and then across the following warp fiber, etc. Satin weaves, as for example 5 harness satin and 8 harness satin, are weaves wherein a single weft fiber goes over a number of warp fibers before going under a number of warp fibers, etc. Satin weaves are designated by the number of warp fibers over which the weft fiber goes before going under. Satin weaves are preferred because they provide a greater amount of fibrous surface area. This is particularly advantageous for using the material of the present invention in situations which must withstand lightning strike, as for example as a component in an airplane. The greater amount of fibrous surface area, the less likely that lightning will hit an intersection. Alternatively, for maximal fibrous surface area, the "weave" can be an entire layer of strands which are aligned adjacent to one another extending in the same direction. The weave types enumerated herein will immediately be recognizable by those skilled in the art.

Any suitable weave direction can be used, as for example, a two direction weave such as the zero ninety weave (warp fiber at zero degrees, weft fiber at ninety degrees) or a three direction weave such as zero, sixty, negative sixty (warp fiber at zero degrees, weft fibers at sixty and negative sixty degrees).

A layer of carbon is deposited on the woven strands of high strength carbon or graphite fibers to a thickness which is preferably from about 1 micron to about 50 microns, and more preferably about 4 microns to about 10 microns. This step of carbon deposition is preferably performed at a high temperature, for instance in a furnace or in contact with any suitable heat supply at from about 800 to about 1100° C. This fuses the junctions between the warp and weft fibers, thus essentially locking in the shape of the fabric-like structure. Therefore, if a particular shape is required, as for example the shape of an airplane wing, it is desirable to place or stretch the fabric-like structure prior to carbon deposition over a ceramic mold or other object which can withstand the high temperatures, thereby holding the fabric-like structure in the desired shape during the carbon deposition step.

Chemical vapor deposition (CVD) methods are preferred. Hydrogen containing methane or benzene gas is flowed over the fibers of the fabric-like structure, the benzene or methane gas breaks down and a layer of carbon is deposited substantially uniformly onto the fibers of the two-dimensional fabric-like structure.

The carbon coated woven strands of the fabric-like structure are then heated to a temperature sufficient to graphitize the outer carbon layer, as for example from about 2500° C. to about 3500° C., preferably from about 2700° C. to about 3300° C. and most preferably at about 3200° C. The heat treatment is preferably carried out in an inert atmosphere, as for example, in argon gas. The heat treatment can be carried out in a number of ways, for example in a furnace or by scanning a laser beam back and forth over the coated fabric-like structure, locally heating sections to about 3000° C., until every bit of the structure has been exposed to the beam. Methods of graphitizing carbon result in planar layers of carbon atoms, each layer in the form of a regular hexagonal network.

FIG. 1 shows a cross section of a single carbon coated polyacrylonitrile hybrid fiber which forms part of the woven network of strands of fibers in the hybrid fabric-like structure of the present invention.

The graphitic layer 4 completely surrounds PAN core fiber 2. Upon graphitization, fused junctions form in the graphite layer 4 where the underlying warp and weft strands of high strength carbon fibers 2 cross in the fabric-like structure. At this point, the resistance of the composite carbon-based fabric-like structure may have been reduced to about 70 $\mu\Omega$-cm or lower.

The graphitic carbon layer of the fabric-like structure is then intercalated using any suitable intercalate. Suitable intercalates for use in the present invention include, all known intercalates including, but not limited to, halogens, mixed halogens, transition metal halides, strongly oxidizing acids and alkali metals. Examples of suitable halogens include bromine, iodine, and chlorine; suitable mixed halides include iodochloride, iodobromide, and bromofluoride; suitable transition metal halides include copper chloride, nickel chloride, and ferric bromide; and suitable strongly oxidizing acids include nitric acid, sulfuric acid and perchloric acid. Halogens are preferred as intercalates with bromine being the preferred halogen. Bromine is the preferred intercalate because it forms stable intercalation compounds with the hybrid graphite fibers which make up part of the fabric-like structure of the present invention.

Any number of intercalation methods known in the art can be used, including vapor phase diffusion and liquid phase intercalation. Vapor phase diffusion entails putting the graphitized fabric-like structure in contact with the vapor phase of the intercalate, as for example with bromine at room temperature or with copper chloride at about 400° C. The reaction conditions for intercalation will of course depend upon the particular intercalate used. In liquid phase intercalation, although there is a need to wash off extra intercalate from the surface of the fabric-like structure after intercalation, a better intercalation compound is usually obtained therefore making liquid phase the preferable intercalation method.

Once the intercalation step is finished, the resistance of the composite material may be as low as approximately 7 $\mu\Omega$-cm or lower. The value of electrical resistance will, of course, vary with the particular intercalate used.

The present invention also pertains to a highly conductive laminate composite. The composite is comprised of at least one first layer of a highly conductive light-weight hybrid material obtained by weaving strands of a first high strength carbon or graphite fiber into a two-dimensional fabric-like structure. A layer of carbon is deposited onto the fibers of the fabric-like structure which is then heat treated to a temperature sufficient to graphitize the carbon layer and intercalated. At least one of the first layers is disposed on at least one second layer of strands of a second carbon or graphite fiber. At least one of the first and the second high strength carbon or graphite fibers is polyacrylonitrile based carbon or pitch based carbon fibers.

This may result in a material having a resistance up to about 14 $\mu\Omega$-cm or more. The resistance depends, of course, upon the particular intercalate used in the intercalation step.

The first layer of the highly conductive lightweight hybrid material provides structural as well as electrical advantages to the composite laminate. For example, referring to FIG. 2, instead of a 4-ply laminate of polyacrylonitrile based carbon fibers or pitch based carbon fibers with an expanded foil cover layer, according to the present invention, a 4-ply laminate could be made. In this laminate, the top layer 106 is made up of the hybrid fabric-like structure of the present invention wherein carbon coating 104 surrounds polyacrylonitrile core 102 and the lower three layers 108 are made of strands of standard polyacrylonitrile based carbon fibers or pitch-based carbon fibers.

The hybrid laminate composite material according to the present invention can further comprise a polymer matrix material containing both the first layer of hybrid material and the second layers. Polymer matrix materials suitable for use in the present invention include but are not limited to epoxy resins and polyamide resins.

A composite sheet or part, for example, a part of an airplane, may be formed incorporating materials according to the present invention into standard techniques for composite manufacture known in the art. These techniques include alternating between layers of sheets of the material and thin film sheets of polymer matrix material, as for example epoxy resins or, alternatively, layering sheets of materials which are preimpregnated with the resin. These composite materials are then cured, according to the curing procedure particular to the polymer matrix material used.

If the part to be made from the composite is not planar or sheetlike in shape, the hybrid fabric-like layer should be first manufactured in the desired final shape, because it will not be very flexible due to fusing of the carbon layer at the junctions between fibers during carbon deposition and subsequent graphitization, and then placed over the remaining conventional carbon layers prior to curing.

What is claimed is:

1. A highly conductive lightweight hybrid material comprising:
    a fabric-like base of intersecting warp and weft strands of high strength carbon or graphite fiber woven into a satin weave,
    a layer of graphitized carbon uniformly disposed on said fiber, said warp and weft fibers being fused at their intersections, and
    an intercalate in said layer.

2. A highly conductive lightweight hybrid material obtained by weaving strands of high strength carbon or graphite fiber into a two-dimensional fabric-like structure having a satin weave, depositing a layer of carbon onto the fiber, heat treating the fabric-like structure at a temperature sufficient to graphitize the carbon layer, intercalating the resulting graphitized carbon layer with an intercalate.

3. The hybrid material according to claim 2, wherein said high strength carbon fiber strands are strands of polyacrylonitrile based carbon fibers or pitch based carbon fibers.

4. The hybrid material of claim 2, wherein said intercalate is selected from the group consisting of halogens, mixed halogens, transition metal halides, and alkali metals.

5. The hybrid material of claim 4, wherein said intercalate is iodochloride, iodobromide, bromofluoride, copper chloride, nickel chloride, or ferric bromide.

6. The hybrid material of claim 4, wherein said intercalate is a halogen.

7. The hybrid material of claim 6, wherein said halogen is bromine, iodine or chlorine.

8. The hybrid material of claim 2, wherein said layer of carbon is from 1 micron to about 50 microns thick.

9. The hybrid material of claim 8, wherein said layer of carbon is from 4 microns to about 10 microns thick.

10. The hybrid material of claim 2, further characterized by having an electrical resistance less than about 70$\mu\Omega$-cm.

11. The hybrid material of claim 10, wherein said electrical resistance is less than about 25 $\mu\Omega$-cm.

12. The hybrid material of claim 11, wherein said electrical resistance is less than about 15 $\mu\Omega$-cm.

13. A highly conductive laminate composite comprising:
    at least one first layer of a highly conductive lightweight hybrid material obtained by weaving strands of a first high strength carbon or graphite fiber into a two-dimensional fabric, depositing a layer of carbon onto the fabric, heat treating the fabric to a temperature sufficient to graphitize the carbon layer, and intercalating the carbon layer; and at least one second layer of strands of at least one second carbon or graphite fiber onto which said at least one first layer is disposed.

14. The hybrid laminate composite of claim 13, wherein at least one of said first and said second high strength carbon or graphite fibers is polyacrylonitrile based carbon fibers or pitch based carbon fibers.

15. The hybrid laminate composite material of claim 14, wherein at least one of said first and said second high strength carbon or graphite fibers is polyacrylonitrile based carbon fibers.

16. The hybrid laminate composite material of claim 14, further comprising a resinous material containing both of said at least one first layer and said at least one second layer.

* * * * *